United States Patent [19]

Sze et al.

[11] 3,974,073
[45] *Aug. 10, 1976

[54] COAL LIQUEFACTION

[75] Inventors: Morgan C. Sze, Upper Montclair; George J. Snell, Fords, both of N.J.

[73] Assignee: The Lummus Company, Bloomfield, N.J.

[ * ] Notice: The portion of the term of this patent subsequent to Dec. 24, 1991, has been disclaimed.

[22] Filed: Sept. 6, 1974

[21] Appl. No.: 503,673

[52] U.S. Cl. .............................. 210/73 R; 208/8; 208/10; 210/53; 210/83
[51] Int. Cl.² .......................................... C10G 1/00
[58] Field of Search ............ 208/8, 10, 180; 210/53, 210/73, 83, 199, 201, 202

[56] References Cited
UNITED STATES PATENTS

| | | | |
|---|---|---|---|
| 2,074,082 | 3/1937 | Domogalla | 210/199 X |
| 3,446,731 | 3/1969 | Harsh | 210/73 X |
| 3,456,798 | 7/1969 | Urdanoff | 210/73 |
| 3,607,716 | 9/1972 | Roach | 208/8 |
| 3,607,717 | 9/1971 | Roach | 208/8 |
| 3,791,956 | 2/1974 | Gorin et al. | 208/8 |
| 3,836,459 | 9/1974 | Shoberg et al. | 210/53 |
| 3,852,183 | 12/1974 | Snell | 208/8 X |
| 3,856,675 | 12/1974 | Sze et al. | 210/73 |
| 3,867,275 | 2/1975 | Gleim et al. | 208/8 |

Primary Examiner—Charles N. Hart
Assistant Examiner—Robert G. Mukai
Attorney, Agent, or Firm—Marn & Jangarathis

[57] ABSTRACT

Insoluble material is separated from a coal liquefaction product by gravity settling in at least two gravity settlers, with overflow from a previous settler being used as feed to the subsequent settler. A promoter liquid having characterization factor of at least 9.75, a 5 volume percent distillation temperature of at least 250°F and a 95 volume percent distillation temperature of at least 350°F. and no greater than 750°F. is employed in each settler.

15 Claims, 1 Drawing Figure

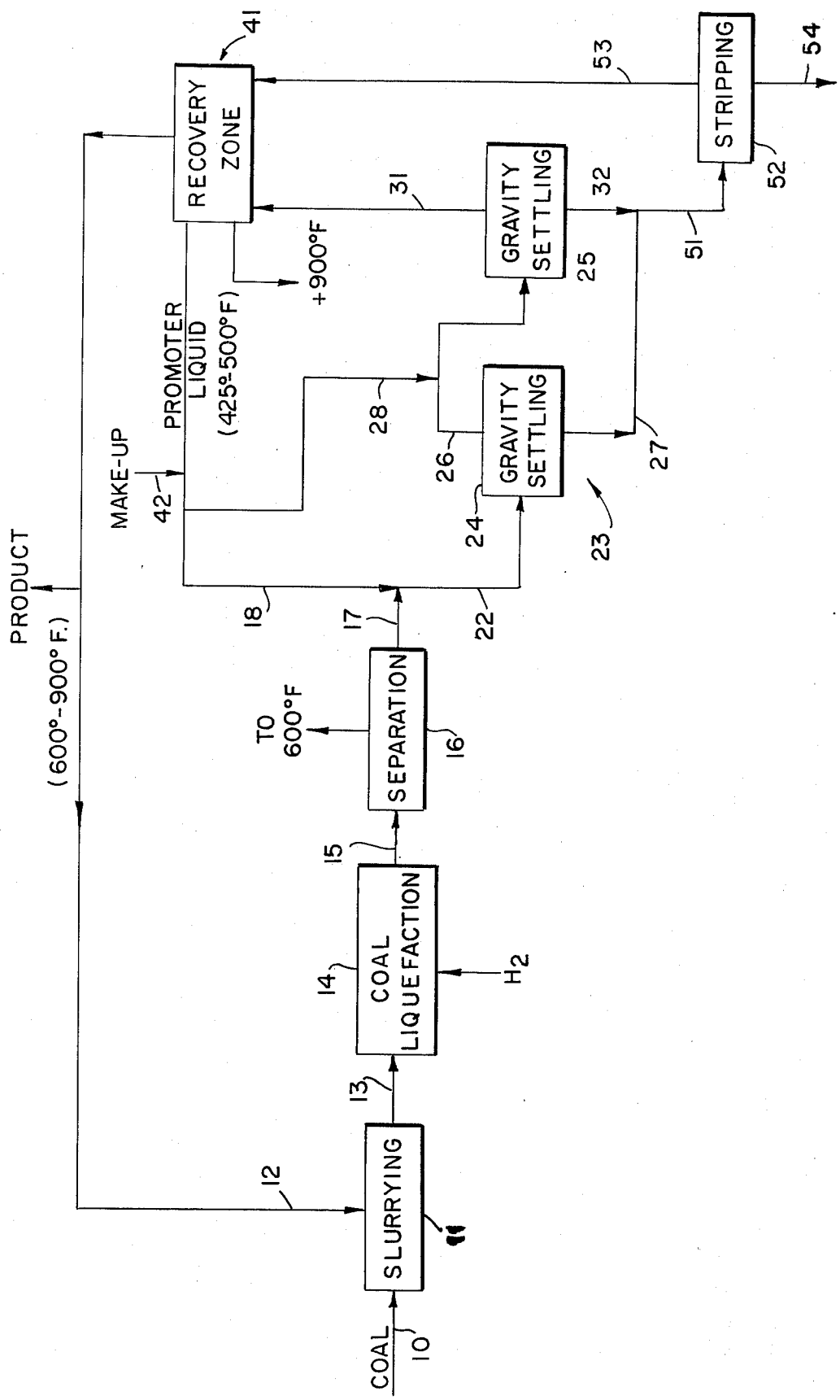

COAL LIQUEFACTION

This invention relates to the liquefaction of coal, and more particularly to the de-ashing of a coal liquefaction product.

Coal can be converted to valuable products by subjecting coal to solvent extraction, with or without hydrogen, to produce a mixture of coal extract and undissolved coal residue, including undissolved extractable carbonaceous matter, fusain and mineral matter or ash.

The finely divided mineral matter or ash and unreacted coal must be separated from the coal extract, and in general, this separation step has been the principal draw-back to the successful operation of a coal extraction process. The fine particle sizes encountered in coal solvation processes create numerous difficulties in attempting to use conventional separation techniques, such as filtration, centrifugation or settling. Attempts to use filtration techniques have not been particularly successful as a result of plugging of the filter pores with or without a precoat and the expense involved in providing the required filtration area.

Gravity settling techniques have also met with limited success as a result of low settling rates and inefficient ash removal. Centrifugation techniques have also been generally unsuccessful as a result of high cost and the difficulty in separating the lighter finely divided materials.

Accordingly, there is a need for an effective process for separating finely divided insoluble material from a coal liquefaction product.

An object of the present invention is to provide for improved coal liquefaction.

Another object of the present invention is to provide a new and improved process for separating finely divided insoluble material from a coal liquefaction product.

A further object of the present invention is to provide a process for separating insoluble material from a coal liquefaction product which does not require a filtration step.

Still another object of the present invention is to provide improved gravity settling for coal deashing.

These and other objects of the present invention should be more readily apparent from reading the following detailed description thereof with reference to the accompanying drawing wherein:

The drawing is a simplified schematic flow diagram of a coal liquefaction process incorporating the teachings of the present invention.

In accordance with the present invention, a coal liquefaction product, comprised of a liquid coal extract of dissolved carbonaceous matter in a coal liquefaction solvent, and insoluble material (ash and unreacted coal) is introduced into a separation zone, containing at least two gravity settlers, with the coal liquefaction product being introduced into the first gravity settler, overflow from the first gravity settler and each gravity settler thereafter being introduced into the next subsequent gravity settler, and a net overflow of a liquid coal extract, essentially free of insoluble material, being recovered from the last gravity settler. Fresh liquid promoter, which promotes and enhances the separation of insoluble material from the coal liquefaction product, is introduced into each gravity settler, with the total amount of liquid promoter being sufficient to provide a net overflow essentially free of insoluble material. It is to be understood that, in some cases, a minor portion of the overflow from one gravity settler can be separately recovered, as product, without being introduced into a subsequent gravity settler. It is also to be understood that the term "fresh promoter liquid" is employed to exclude the promoter liquid present in the overflow from one gravity settler which is introduced in the feed to a subsequent gravity settler.

The liquid which is employed to enhance and promote the separation of insoluble material from the coal liquefaction product is generally a hydrocarbon liquid having a characterization factor (K) of at least 9.75 and preferably at least about 11.0 wherein:

$$K = \sqrt[3]{T_B}/G$$

wherein $T_B$ is the molal average boiling point of the liquid (°R); and G is specific gravity of the liquid (60°F/69°F).

The characterization factor is an index of the aromaticity/parafinicity of hydrocarbons and petroleum fractions as disclosed by Watson & Nelson Ind. Eng. Chem. 25 880 (1933), with more parafinic materials having higher values for the characterization factor (K). The promoter liquid which is employed is one which has a characterization factor (K) in excess of 9.75 and which is also less aromatic than the liquefaction solvent; ie., the characterization factor K of the promotor liquid has a value which is generally at least 0.25, higher than the characterization factor of the liquefaction solvent.

The following table provides representative characterization Factors (K) for various materials:

Table

| | |
|---|---|
| Anthracene | 8.3 |
| Naphthalene | 8.4 |
| 425–500°F. Coal Tar Distillate | 8.8 |
| 550–900°F. Coal Tar Distillate | 9.1 |
| 600–900°F. Coal Tar Distillate | 9.0 |
| 400–450°F. Coal Tar Distillate | 9.4 |
| Benzene | 9.8 |
| Tetrahydronaphthalene | 9.8 |
| o-xylene | 10.3 |
| Decahydronaphthalene | 10.6 |
| Cyclohexane | 11.0 |
| 425–500°F. Boiling Range Kerosene | 11.9 |
| n-Dodecylbenzene | 12.0 |
| Propylene Oligomers (pentamer) | 12.2 |
| Cetene | 12.8 |
| Tridecane | 12.8 |
| n-Hexane | 12.9 |
| Hexadecane or cetane | 13.0 |

The liquid which is used to enhance and promote the separation of insoluble material is further characterized by a 5 volume percent distillation temperature of at least about 250°F. and a 95 volume percent distillation temperature of at least about 350°F. and no greater than about 750°F. The promoter liquid preferably has a 5 volume percent distillation temperature of at least about 310°F. and most preferably of at least about 400°F. The 95 volume percent distillation temperature is preferably no greater than about 600°F. The most preferred promoter liquid has a 5 volume percent distillation temperature of at least about 425°F. and a 95 volume percent distillation temperature of no greater than about 500°F. It is to be understood that the promoter liquid may be a hydrocarbon; e.g., tetrahydronaphthalene, in which case the 5 volume percent and 95 volume percent distillation temperatures are the same; i.e., the hydrocarbon has a single boiling point. In such a case, the boiling point of the hydrocarbon must be at least about 350°F. on order to meet the requirement of a 5 volume percent distillation temperature of at least about 250°F. and a 95 volume percent distillation temperature of at least about 350°F. The promoter liquid is preferably a blend or mixture of hydrocarbons in which case the 5 volume percent and 95 volume percent distillation temperatures are not the same.

The 5 volume and 95 volume percent distillation temperature may be conveniently determined by ASTM No. D 86 - 67 or No. D 1160 with the former being preferred for those liquids having a 95% volume distillation temperature below 600°F. and the latter for those above 600°F. The methods for determining such temperatures are well known in the art and further details in this respect are not required for a full understanding of the invention. It is also to be understood that the reported temperatures are corrected to atmospheric pressure.

As representative examples of such liquids, there may be mentioned: kerosene or kerosene fraction from paraffinic or mixed base crude oils; middle distillates, light gas oils and gas oil fractions from paraffinic or mixed based crude oils; alkyl benzenes with side chains containing ten or more carbon atoms; paraffinic hydrocarbons containing more than 12 carbon atoms; white oils or white oil fraction derived from crude oils; alphaolefins containing more than 12 carbon atoms; fully hydrogenated naphthalenes and substituted naphthalenes; propylene oligomers (pentamer and higher); tetrahydronaphthalene, heavy naphtha fractions, etc. The most preferred liquids are kerosene fractions; white oils; fully hydrogenated naphthalenes and substituted naphthalenes; and tetrahydronaphthalene.

The amount of liquid promoter used for enhancing and promoting the separation of insoluble matter from the coal liquefaction product will vary with the particular liquid employed, the coal liquefaction solvent, the coal used as starting material and the manner in which the liquefaction is effected. As should be apparent to those skilled in the art, the total amount of liquid promoter used should be minimized in order to reduce the overall costs of the process. It has been found that by using the liquid of controlled aromaticity, in accordance with the teachings of the present invention, the desired separation of insoluble material may be effected with modest total amounts of liquid promoter. In general, the gravity settling in the at least two gravity settlers is effected with a total liquid promoter to coal solution weight ratio from about 0.2:1 to about 3.0:1, preferably from about 0.3:1 to about 2.0:1, and most preferably from about 0.3:1 to about 1.5:1. In using a preferred promoter liquid of the present invention, which is a kerosene fraction having 5% and 95% volume distillation temperature of 425° F and 500°F, respectively, the total promoter liquid to coal solution weight ratios in the order of 0.4:1 to 0.6:1 have been particularly successful. It is to be understood, however, that greater total amounts of liquid promoter may be employed, but the use of such greater amounts is uneconomical. In addition, the use of an excess of liquid promoter may result in the precipitation or separation of an excessive amount of desired coal derived products from the coal extract. More particularly, as the total amount of liquid promoter employed is increased, a greater amount of ash is separated from the coal solution, but such an increased separation is accompanied by an increased separation of desired coal products from the coal solution. By using the liquid promoters of the present invention, not only may modest amounts of solvent by employed, but in addition, ash may be effectively separated from the coal solution; e.g., in amounts greater than 99%, without an excessive loss of desired coal derived products.

More particularly, coal, such as bituminous coal, on a moisture ash free basis (MAF) may contain from about 5% to about 10% of insoluble material, such as fusain, and accordingly, at a minimum, from about 5% to about 10%, of the MAF coal, is lost in the process. In the recovery of coal derived products by a solvation process, the potential product loss is measured by the amount of 850°F+ product which is not recovered from the coal in that it is this fraction, which includes insoluble coal material, such as fusain, which can not be recovered from the residual solid product of the coal deashing. In accordance with the present invention, on a MAF coal feed basis, product loss of 850°F+ components (on an ash free basis) can be maintained at a value of no greater than about 40%, by weight, and preferably no greater than about 25%, by weight. In general, the loss of 850°F. + products, on a MAF coal basis, is from about 10% to about 25%, by weight. In addition, the net coal product (the extracted carbonaceous matter, excluding promoter liquid, liquefaction solvent and gas make), hereinafter sometimes referred to as "coal product", contains less than about 1% insoluble material, generally less than 0.1% insoluble material and most preferably less than 0.05% insoluble material, all by weight. The specific amount of insoluble material which is permitted to be present in the coal product is dependent upon the product standards, and the deashing is controlled in order to provide the required specifications. Based on an Illinois type, the production of a coal product having less than 0.05%, by weight, insoluble material, corresponds to 99+% ash removal but as should be apparent to those skilled in the art, the percent ash removal to provide a coal product having the required minimum amount of insoluble material is dependent upon the initial ash content of the coal. Thus, in accordance with the present invention, the liquid promoter is added to the coal solution in an amount, as hereinabove, described, to provide a coal product in which insoluble material is present in an amount of less than about 1%, by weight, and most preferably of less than 0.05%, by weight, with the loss of 850°F+ product being from about 10% to about 40%, by weight, preferably from about 10% to about 25%, by weight, on a MAF coal feed basis; ie., from about 60% to about 90%, by weight, of the MAF coal feed is recovered as either gas make or liquid fuel product.

The liquid promoter may also be prepared by blending a material having a characterization factor below 9.75 with a material having a characterization factor above 9.75, provided the blend has a characterization factor above 9.75 and the boiling properties, as hereinabove described. The use of blended materials is a convenient manner of regulating the characterization factor.

The separation of the insoluble material from the coal extract is generally effected in each of the gravity settlers at a temperature from about 300°F. to about 600°F., preferably from about 350°F. to about 500°F., and at a pressure from about 0 psig to about 500 psig, preferably at a pressure from about 0 psig to about 300 psig. It is to be understood that higher pressures could be employed, but as should be apparent to those skilled in the art, lower pressures are preferred. In each of the gravity settlers, the amount of underflow should be minimized in order to minimize the loss of heavier products in the underflow. The underflow withdrawal rate to obtain desired results is deemed to be within the scope of those skilled in the art. In general, in each settler, such a rate is from about 10 to 30 wt. percent, preferably from about 20 to about 25 wt. percent of the total feed (liquefaction product and promoter liquid) thereto. The residence time for such settling is generally in the order of from about 0.5 to about 6 hours, and preferably from about 0.5 to 3.0 hours.

As hereinabove noted, the gravity settling is effected in at least two gravity settlers and although three, four or more gravity settlers may be employed, in general, the gravity settling is effected in two gravity settlers, with the overflow from the first gravity settler being fed to the second gravity settler, and net overflow being recovered from the second gravity settler.

In accordance with the preferred procedure of the present invention, a major portion of the total fresh promoter liquid is added to the first gravity settler, with the remaining portions of the total fresh promoter liquid being added to the remaining gravity settlers. In the case where two gravity settlers are employed, the weight ratio of fresh promoter liquid introduced into the first settler to coal liquefaction product is from about 0.2:1 to 0.7:1, and the weight ratio of the fresh promoter liquid introduced into the second settler to the coal liquefaction product is from about 0.1:1 to 0.3:1 with the major portion of the total fresh promoter liquid being introduced into the first settler.

In accordance with a preferred embodiment of the present invention, the coal liquefaction product, prior to mixing thereof with the promoter liquid, is treated to separate at least those components boiling up to about the 95 volume percent distillation temperature of the promoter liquid. In this manner, the coal liquefaction product is free of components which boil within the range of those present in the promoter liquid, thereby facilitating the subsequent recovery of the promoter liquid from the coal liquefaction product.

The invention will be further described with respect to an embodiment thereof illustrated in the accompanying drawing. It is to be understood, however, that the scope of the invention is not to be limited thereby.

Referring to the drawing, ground or pulverized coal, generally bituminous, sub-bituminous or lignite, preferably bituminous coal, in line 10 is introduced into a coal solvation and slurrying zone 11 along with a coal liquefaction solvent in line 12. The coal liquefaction solvent may be any one of the wide variety of coal liquefaction solvents used in the art, including both hydrogen donor solvents, non-hydrogen donor solvents and mixtures thereof. These solvents are well known in the art and, accordingly, no detailed description thereof is deemed necessary for a full understanding of the invention. As particularly described, the coal liquefaction solvent is a 600°F–900°F solvent which is recovered from the coal liquefaction product and which has not been subjected to hydrogenation subsequent to the recovery thereof. The solvent is added to the coal in an amount sufficient to effect the desired liquefaction, and in general, is added in an amount to provide a solvent to coal weight ratio from about 1:1 to about 20:1, and preferably from about 1.5:1 to about 5:1.

A coal paste is withdrawn from zone 11 through line 13 and introduced into a coal liquefaction zone 14 wherein, as known in the art, the coal is converted to liquid products. The liquefaction zone 14 is operated as known in the art and may be catalytic or non-catalytic and may be effected in the presence or absence of added hydrogen. The hydrogenation may be effected in a fixed catalyst bed, fluidized catalyst bed or in an expanded or ebullating bed. The details of the coal liquefaction step form no part of the present invention and, accordingly, no details thereof are required for a full understanding of the invention. As particularly described, the coal liquefaction is effected in the presence of added hydrogen. The hydrogenation, as known in the art, increases the recovery of coal products and also reduces the sulfur and nitrogen content of the recovered liquid coal product. The liquefaction is preferably effected in an upflow ebullated bed, as known in the art; e.g., as described in U.S. Pat. No. 2,987,465 to Johanson. The coal liquefaction zone, as known in the art, includes means for recovering the various gaseous products.

A coal liquefaction product, comprised of a liquid coal extract of dissolved carbonaceous matter in the coal liquefaction solvent and insoluble material (ash and undissolved coal) is withdrawn from the liquefaction zone 14 through line 15 and introduced into a separation zone 16 to separate from the coal liquefaction product at least those materials boiling up to about the 95 volume percent distillation temperature of the liquid to be used for promoting and enhancing the separation of the insoluble material. The separation zone 16 may include an atmospheric or vacuum flashing chamber or tower, and as particularly described separation zone 16 is designed and operated to separate components boiling up to about 600°F.

A coal liquefaction product, free of components boiling up to about 600°F, withdrawn from separation zone 16 through line 17, is mixed with a first portion in line 18 of the total amount of promoter liquid of controlled aromaticity, i.e., the characterization factor of the promoter liquid has a value which is generally at least 0.25 units greater than the characterization factor of the coal liquefaction solvent. As particularly described, the promoter liquid is a kerosene fraction which has 5 volume percent and 95 volume percent distillation temperatures which fall within the range from about 425°–500°F and is derived from a naphthenic or paraffinic distillate.

The combined stream of coal liquefaction product and promoter liquid, in line 22, is introduced into a separation zone 23, comprised of gravity settlers 24 and 25. It is to be understood, however, that as hereinabove described, separator zone 23, may contain more than two gravity settlers.

The combined stream in line 22, in particular, is introduced into gravity settler 24 wherein the combined stream is separated into a solids lean overflow, withdrawn through line 26, and a solid enriched underflow, withdrawn through line 27.

The overflow in line 26 is thoroughly mixed with the remaining portion of the total amount of promoter liquid, in line 28, and the combined stream is introduced into gravity settler 25 wherein the stream is separated into an essentially solid free overflow, withdrawn through line 31, and a solid enriched underflow withdrawn through line 32.

The overflow in line 31 is introduced into a recovery zone 41 for recovering promoter liquid and varius fractions of the coal extract. The recovery zone 41 may be comprised of one or more fractionators to distill various fractions from the product. As particularly described, the recovery zone is operated to recover a first fraction having 5% and 95% volume distillation temperatures of from 425° to 500°F. which is to be used as the promoter liquid for enhancing and promoting separation of solid material from the coal liquefaction product; a second fraction (600°–900°F) a portion of which may be used as the coal liquefaction solvent in line 12 and a further portion thereof recovered as product, and a residual product (+900°F) of low ash and reduced sulfur content which may be used as a fuel or subjected to further treatment. The promoter liquid recovered in the recovery zone is employed in lines 18 and 22 and makeup may be provided through line 42.

The underflow containing dispersed insoluble material withdrawn from gravity settlers 24 and 25 is combined in line 51 and introduced into a stripping zone 52 wherein material boiling below about 900°F is stripped therefrom and introduced into the recovery zone 41 through line 53. The ash rich stripper bottoms in line 54 may then be subjected to calcination or coking. Alternatively, part of the stripper bottoms may be used as feedstock to a partial oxidation process for producing hydrogen. As a further alternative a portion of the stripper bottoms may be used for plant fuel. These uses and others should be apparent to those skilled in the art from the teachings herein. In accordance with the present invention, the stripper bottoms in line 53 contains from about 10% to about 40%, by weight, of the MAF coal. In addition the coal product (the product recovered from zones 16 and 41, excluding liquefaction solvent and promoter liquid, contains less than 1% and preferably less than 0.05%, by weight, of insoluble material.

The invention will be further described with respect to the following example, but it is to be understood that the scope of the invention is not to be limited thereby.

EXAMPLE 1

Three gals. per hour at 200°F (27.8 lbs/hr) of a coal liquefaction product containing 9.0 wt. % ash, and having an atmospheric pressure initial boiling point of about 580°F are continuously pumped from a 500 gallon blend tank to a 1st stage in line mixing zone operating at 550°± 10°F. A nominal 425°–500°F kerosene distillate with a characterization factor of 11.8±0.1 is simultaneously fed at a rate of 2.3 gal/hr at room temperature (16.0 lbs/hr) to the above in-line mixer. The thoroughly mixed admixture from the mixing zone is continuously routed to a 16 gallon heated gravity settler operating at 550°±10°F and a pressure of 130 psig.

A partially deashed overflow product stream and an ash enriched underflow product stream is continuously withdrawn from the heated 1st stage gravity settler. The 1st stage settler underflow steam is cooled to about 300°F and collected in a 1st stage scale tank. On the average about 28 lbs of 1st stage underflow product are withdrawn per 100 lbs of total 1st stage settler feed. The ash content of a composite sample of first stage overflow product and 1st stage underflow product is about 1.0 wt. % and 17.7 wt. % respectively.

Overflow product (1.0% ash) from the 1st stage settler is continuously fed to a 2nd stage mixing zone operating at 550°±10°F where it is continuously admixed with an additional 0.6 gals/hr (4.0 lbs/hr) of kerosene distillate. The kerosene distillate used is identical in quality to the kerosene distillate added to the 1st stage mixing zone. Admixture from the 2nd stage mixing zone is routed to a 2nd stage 16 gallon heated gravity settler operating at 550±10°F and at a pressure of 130 psig.

A substantially ash free overflow product and ash enriched underflow product are simultaneously and continuously withdrawn from the 2nd stage gravity settler. The 2nd stage underflow stream is cooled to 300°F and collected in a 2nd stage scale tank. On the average about 7.6 lbs/hr of 2nd stage underflow product was collected in a 2nd stage underflow scale tank. Second stage overflow product is cooled to about 200°F and stored in a 500 gallon agitated storage tank. The ash content of a composite sample of 2nd stage overflow product withdrawn from the agitated 500 gallon storage tank is 0.01 wt. %. The deashing run described in this example terminated after about 72 hours of operation.

EXAMPLE 2

Three gals. per hour at 200°F (27.8 lbs/hr) of the coal liquefaction product in Example 1 are continuously pumped from a 500 gallon blend tank to an inline mixing zone operating at 550°±10°F. A nominal 425°–500°F kerosene distillate with a characterization factor of 11.8±0.1 is simultaneously fed at a rate of 2.9 gal/hr at r.t. (20.0 lbs/hr) to the above inline mixer. The thoroughly mixed admixture from the mixing zone is continuously routed to a 16 gallon heated gravity settler operating at 550°±10°F and a pressure of 130 psig.

A substantially ash free overflow product and ash enriched underflow product stream are continuously withdrawn from the heated gravity settler. Each settler effluent stream is cooled to about 200°F and collected in separate scale tanks. On the average about 45 lbs of underflow product are withdrawn per 100 lbs of total settler feed. The above deashing run is terminated after about 400 lbs of ash enriched composite underflow is collected in the underflow scale tank. Representative composite 2-gallon samples of the overflow are withdrawn from the overflow scale tanks and analyzed for ash content. The ash content of the composite overflow and underflow products collected during the deashing run are 0.04 and 12.5 weight percent respectively. Overflow product quality (ash content) is poorer in this example than the two stage deashing process described in Example 1.

The present invention is particularly advantageous in producing an overflow product containing low ash contents; i.e., less than 0.04 weight percent.

Numerous modifications and variations of the present invention are possible in light of the above teachings and, therefore, within the scope of the appended claims the invention may be practiced otherwise than as particularly described.

What is claimed is:

1. A process for separating insoluble material from a coal liquefaction product produced from a coal feed and comprised of insoluble material and carbonaceous matter dissolved in a coal liquefaction solvent comprising:

introducing the coal liquefaction product into a separation zone containing at least two gravity settlers, with the coal liquefaction product being introduced into the first of the at least two gravity settlers, and overflow from a preceding gravity settler being fed to the next gravity settler and net overflow being recovered from the last of the at least two gravity settlers;

introducing fresh liquid promoter into each of at least two gravity settlers, said liquid promoter having a characterization factor of at least 9.75, a 5 volume percent distillation temperature of at least about 250°F and a 95 volume percent distillation temperature of at least about 350°F and no greater than about 750°F, the fresh liquid promoter being added in a total amount sufficient to recover from the last gravity settler a net overflow essentially free of insoluble material, and recovering from each gravity settler an underflow containing insoluble material.

2. The process of claim 1 wherein the weight ratio of fresh promoter liquid introduced into the first of two gravity settlers to coal liquifaction product is from about 0.2:1 to 0.7:1, the weight ratio of fresh promoter liquid introduced into the second of two gravity settlers to coal liquefaction product is from about 0.1:1 to about 0.3:1, and a major portion of the promoter liquid is introduced into the first of the two gravity settlers.

3. The process of claim 2 wherein the liquid promoter is at least one member selected from the group consisting of kerosene, kerosene fractions, middle distillates, light gas oils, gas oil fractions, heavy napthas, white oils and white oil fractions, all from crude oils.

4. The process of claim 2 wherein the 5 volume percent distillation temperature of the liquid promoter is at least about 310°F.

5. The process of claim 4 wherein said gravity settling is effected at a temperature from about 300°F to about 600°F and a pressure from about 0 psig to about 500 psig.

6. The process of claim 5 wherein the promoter liquid is a fraction having a 5 volume percent distillation temperature of at least about 425°F and a 95 volume percent distillation temperature of no greater than about 500°F.

7. A process for separating insoluble material from a coal liquefaction product produced from a coal feed and comprised of insoluble material and carbonaceous matter dissolved in a coal liquefaction solvent, comprising:

effecting said separation in a gravity settling zone in the presence of a liquid promoter of a hydrocarbon mixture, said liquid promoter having a 5 volume percent distillation temperature of at least about 250°F and a 95 volume percent distillation temperature of at least about 350°F and no greater than about 750°F, said liquid promoter being at least one member selected from the group consisting of kerosene, kerosene fractions, middle distillates, light gas oils, gas oil fractions, heavy naphthas, white oils and white oil fractions from crude oils, and having a characterization factor (K) of at least 9.75, said liquid having a characterization factor greater than said coal liquefaction solvent; said gravity settling zone containing two gravity settlers with a portion of the total fresh liquid promoter employed being introduced into each of the two gravity settlers, with the coal liquifaction product being introduced into the first gravity settler, overflow from the first gravity settler being introduced into the second gravity settler and net overflow being recovered from the second gravity settler, the weight ratio of fresh promoter liquid introduced into the first gravity settler to coal liquifaction product being from about 0.2:1 to about 0.7:1, the weight ratio of fresh promoter liquid introduced into the second gravity settler to coal liquifaction product being from about 0.1:1 to 0.3:1, with a major portion of the promoter liquid being introduced into the first gravity settler; the total fresh liquid promoter to coal liquifaction weight ratio being in an amount which produces an essentially insoluble material free net overflow from the second gravity settler and a net coal product from said coal feed containing less than about 0.05 percent, by weight, insoluble material; and a combined underflow from the two gravity settlers which contains the insoluble material, said combined underflow containing no greater than about 40 percent, by weight, of the moisture ash free coal as an ash free +850°F fraction.

8. The process of claim 7 wherein said 5 volume percent distillation temperature is at least about 400°F.

9. The process of claim 7 wherein said promoter liquid is a kerosene fraction having a characterization factor of about 11.9, a 5 volume percent distillation temperature of at least about 425°F, and a 95 volume percent distillation temperature of no greater than about 500°F.

10. The process of claim 9 wherein said total promoter liquid to coal liquefaction product weight ratio is from about 0.4:1 to about 0.6:1.

11. The process of claim 7 wherein said settling zone is operated at a temperature from about 300°F to about 600°F and at a pressure from about 0 psig to about 500 psig.

12. The process of claim 7 wherein the liquid promoter has a characterization factor of at least about 11.0.

13. The process of claim 7 wherein the promoter liquid has a 5 volume percent distillation temperature of no greater than about 600°F.

14. The process of claim 7 wherein the promoter liquid is a fraction having a 5 volume percent distillation temperature of at least about 425°F and a 95 volume percent distillation temperature of no greater than about 500°F.

15. The process of claim 7 wherein the characterization factor of the liquid promoter has a value at least 0.25 higher than the characterization factor of the coal liquefaction solvent.

* * * * *

UNITED STATES PATENT OFFICE
CERTIFICATE OF CORRECTION

Patent No. 3,974,073            Dated August 10, 1976

Inventor(s) MORGAN C. SZE ET AL

It is certified that error appears in the above-identified patent and that said Letters Patent are hereby corrected as shown below:

In the Specification column 2, line 13 the formula (K) should read as follows:

$$K = \frac{\sqrt[3]{T_B}}{G}$$

Signed and Sealed this

Thirteenth Day of January 1981

[SEAL]

*Attest:*

SIDNEY A. DIAMOND

*Attesting Officer*      *Commissioner of Patents and Trademarks*